(12) United States Patent
Salter et al.

(10) Patent No.: US 10,286,840 B2
(45) Date of Patent: May 14, 2019

(54) VEHICLE LIGHTING ASSEMBLY USING PANEL WITH LIGHT REFLECTING FILM

(71) Applicant: Ford Global Technologies, LLC, Dearborn, MI (US)

(72) Inventors: Stuart C. Salter, White Lake, MI (US); Wei Xu, Nanjing (CN); Paul Kenneth Dellock, Northville, MI (US); Alex Lince, St. Clair Shores, MI (US); Satyanarayana Raju Vemulapati, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/681,617

(22) Filed: Aug. 21, 2017

(65) Prior Publication Data
US 2019/0054856 A1 Feb. 21, 2019

(51) Int. Cl.
B60Q 3/208 (2017.01)
B60Q 3/64 (2017.01)
B60Q 3/74 (2017.01)
B62D 25/06 (2006.01)
F21V 8/00 (2006.01)

(52) U.S. Cl.
CPC ............ B60Q 3/208 (2017.02); B60Q 3/64 (2017.02); B60Q 3/745 (2017.02); B62D 25/06 (2013.01); G02B 6/0046 (2013.01); G02B 6/0051 (2013.01)

(58) Field of Classification Search
CPC . B60Q 3/12; B60Q 3/20; B60Q 3/208; B60Q 3/51; B60Q 3/54; B60Q 3/64; B60Q 3/74; B60Q 3/745
USPC .................................................. 362/488–490
See application file for complete search history.

(56) References Cited

U.S. PATENT DOCUMENTS

| 6,666,571 | B2 | 12/2003 | Becher et al. | |
| 7,284,886 | B2 | 10/2007 | Chen et al. | |
| 2010/0214795 | A1* | 8/2010 | Salter | B60Q 3/54 |
| | | | | 362/488 |
| 2016/0375824 | A1* | 12/2016 | Heike | B60Q 3/82 |
| | | | | 362/464 |
| 2017/0146204 | A1* | 5/2017 | Di Trapani | F21S 8/006 |
| 2018/0029531 | A1* | 2/2018 | Di Trapani | B60Q 3/233 |
| 2018/0086028 | A1* | 3/2018 | Berard | B32B 17/10541 |

* cited by examiner

Primary Examiner — Diane I Lee
Assistant Examiner — Keith G. Delahoussaye
(74) Attorney, Agent, or Firm — Vichit Chea; Price Heneveld LLP

(57) ABSTRACT

A vehicle lighting assembly is provided that includes a window panel provided on a vehicle body and a light reflecting medium provided on a surface of the window panel. The vehicle lighting assembly also includes a plurality of lighting assemblies each comprising a plurality of light sources arranged to direct light onto the reflecting medium for reflection towards different areas in the vehicle interior.

20 Claims, 5 Drawing Sheets

VEHICLE LIGHTING ASSEMBLY USING PANEL WITH LIGHT REFLECTING FILM

FIELD OF THE INVENTION

The present invention generally relates to vehicle lighting, and more particularly relates to a vehicle interior dome and map/reading lighting assembly.

BACKGROUND OF THE INVENTION

Automotive vehicles, such as wheeled vehicles, are commonly equipped with a plurality of interior lighting devices for illuminating the passenger compartment. For example, automotive vehicles typically include a dome lamp for providing light illumination when one or more vehicle doors are open to provide general area lighting for occupants of the vehicle to move in and out of the vehicle. Additionally, automotive vehicles are commonly equipped with a plurality of reading lamps that provide lighting to enable passengers to read, view maps, and otherwise aid in vision. Dome and reading lights are typically fixed in the headliner or an overhead console and direct light in a fixed direction. It is therefore desirable to provide for an enhanced lighting assembly that allows for dome and reading light that offer enhanced functionality for passengers in the vehicle.

SUMMARY OF THE INVENTION

According to one aspect of the present invention, a vehicle lighting assembly is provided. The vehicle lighting assembly includes a panel provided on a vehicle, a light reflecting medium provided on a surface of the panel, and a plurality of light sources arranged to direct light onto the light reflecting medium for reflection within an interior of the vehicle.

Embodiments of the first aspect of the invention can include any one or a combination of the following features:
the panel includes a substantially transparent window;
the light reflecting medium is provided within a frit area of the window;
the window is located in a vehicle roof;
the light reflecting medium comprises a partially reflective and partially transmissive film;
the plurality of light sources comprises a first plurality of light sources arranged to direct light off the light reflecting medium into a first area of the vehicle interior and a second plurality of light sources arranged to direct light off the light reflecting medium onto a different second area of the vehicle interior;
the first area is a first seating area and the second area is a second seating area; and
the assembly further includes a capacitive switch for activating the plurality of light sources.

According to another aspect of the present invention, a vehicle lighting assembly is provided. The vehicle lighting assembly includes a panel provided on a vehicle, a light reflecting medium provided on a surface of the panel, and a plurality of lighting assemblies arranged to direct light onto the light reflecting medium for reflection towards first and second areas in an interior of the vehicle.

Embodiments of the second aspect of the invention can include any one or a combination of the following features:
the panel includes a substantially transparent window;
the light reflecting medium is provided within a frit area of the window;
the window is located in a vehicle roof;
the light reflecting medium comprises a partially reflective and partially transmissive film;
the plurality of lighting assembly comprises a first plurality of light sources arranged to direct light off the light reflecting medium into the first area in the vehicle interior and a second plurality of light sources arranged to direct light off the reflected medium onto the second area in the vehicle interior;
the first area is a first seating area and the second area is a second seating area; and
the assembly further includes a capacitive switch for activating the plurality of light sources.

According to yet another aspect of the present invention, a vehicle lighting assembly is provided. The vehicle lighting assembly includes a window panel provided on a body of a vehicle, and a light reflecting medium provided on a surface of the window panel. The assembly also includes a first lighting assembly comprising a first plurality of light sources arranged to direct light onto the reflecting medium for reflection towards a first area in an interior of the vehicle, and a second lighting assembly comprising a second plurality of light sources arranged to direct light onto the reflecting medium for reflection towards a second area in the vehicle interior.

Embodiments of the third aspect of the invention can include any one or a combination of the following features:
the window is located in a vehicle roof;
the first area is a first seating area and the second area is a second seating area; and
the assembly further includes a capacitive switch for activating the plurality of light sources.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
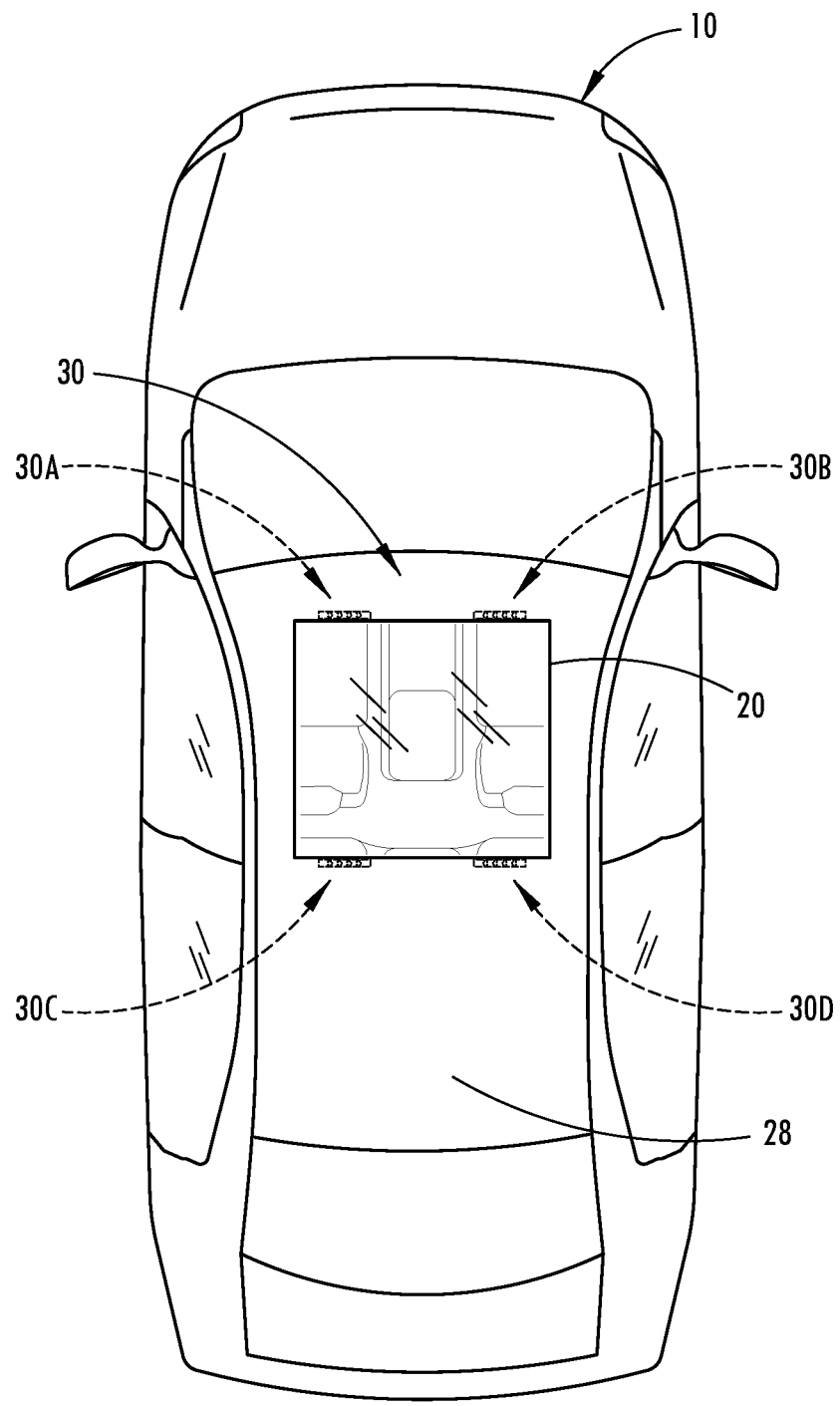
FIG. 1 is a top schematic view of a vehicle equipped with a vehicle lighting assembly that reflects light off a roof mounted window panel, according to one embodiment.
Figure 2:
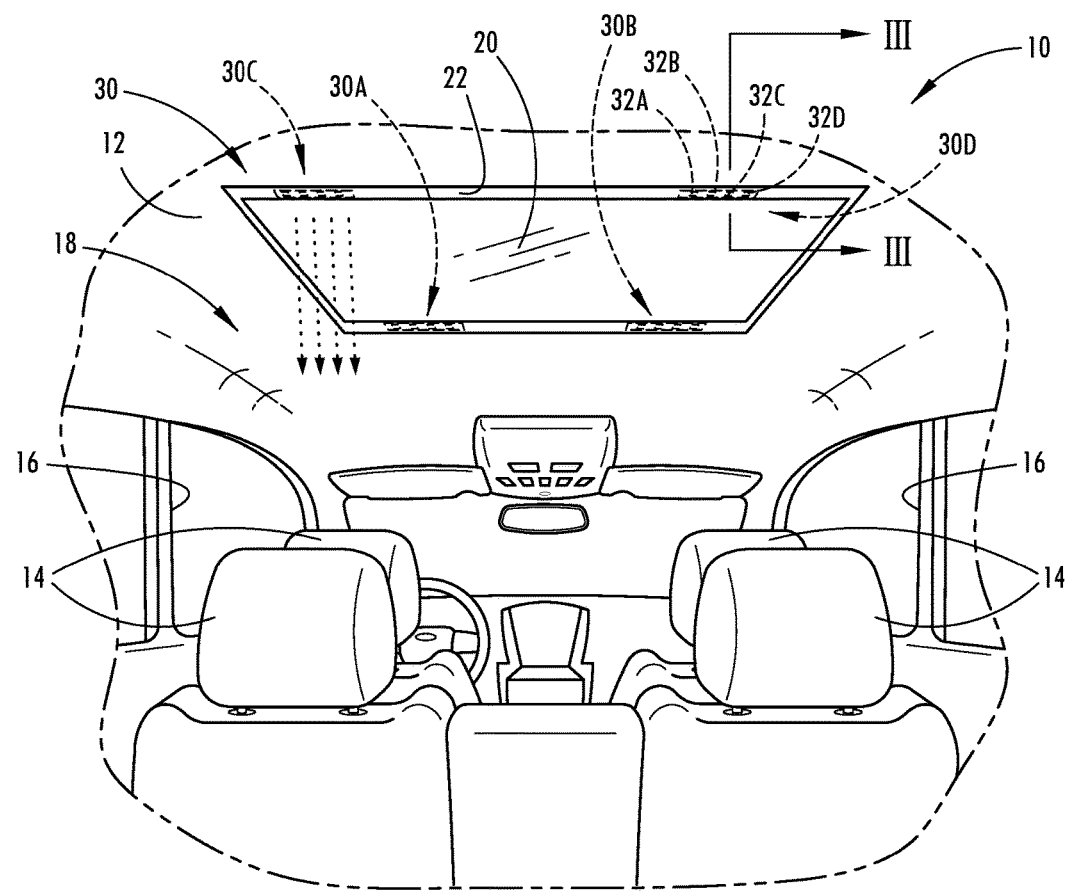
FIG. 2 is a rear perspective view of the interior of the vehicle further illustrating the vehicle lighting assembly.

Referring to FIGS. 1 and 2, a vehicle 10, such as a wheeled automotive vehicle, is generally illustrated having a vehicle lighting assembly 30 arranged in the vehicle interior 18, according to one embodiment. The vehicle 10 generally includes the vehicle interior 18, shown configured as a passenger compartment, which includes passenger seating areas having a plurality of passenger seats 14 each adapted to hold a passenger for seating within the vehicle interior 18. Passengers may enter and exit from the vehicle 10 via side doors 16, each of which may operatively engage a dome light input switch which switches state based on whether the door 16 is in the open position or closed position and activates dome lighting when a door is in the open position. Additionally, a user input switch may be provided on the dashboard or elsewhere in the vehicle and is generally accessible to the driver of the vehicle for controlling interior dome lights, including turning on and off one or more lighting assemblies included in the vehicle lighting assembly 30.

The vehicle 10 further includes a vehicle body that generally contains the passenger compartment or vehicle interior 18 and includes a roof 28 that forms a ceiling on the top side of the vehicle interior 18. A trim component, such as a headliner 12, is assembled onto the interior side of the roof 28. The vehicle 10 further includes a window panel 20 in the form of a substantially transparent window located on the roof 28. The window panel 20 may be a moonroof according to one embodiment or a panoramic window, according to another embodiment. The window panel 20 is installed within an opening formed in the roof 28 and enables light to enter the vehicle 10 and enables passengers to view the exterior environment through the window panel 20. Window panel 20 may be a panoramic window which is fixed or movable in the roof 28 or may be a moonroof that moves relative to the roof 28 between an open position and a closed position or is fixed in the roof. The headliner 12 likewise has an opening defined by an edge portion 22 forming a rim that generally circumscribes the perimeter of the window panel 20 on the bottom side. The edge portion 22 therefore extends around the window panel 20 and is slightly below the window panel 20.

The vehicle 10 further includes a vehicle lighting assembly 30 located on the roof 28, particularly within the headliner 12, that utilizes light reflection off of the window panel 20 to provide a dome and/or reading light (lamp) to illuminate light within the interior 18 of the vehicle 10. The term "dome light" is recognized in the vehicle interior lighting art as light that provides general area lighting. The term "reading light" is interchangeable with the term "map light" and both terms are known in the art for providing more focused light to enable passengers to read and view maps.

In the embodiment shown, the vehicle lighting assembly 30 includes four lighting assembles 30 assembled to the edge portion 22 of the headliner 12 in the interior 18 of the vehicle 10, each oriented to output a light beam towards a different area within the interior 18 of the vehicle 10. The vehicle lighting assembly 30 includes a first lighting assembly 30A configured to illuminate light onto a first seating area where a driver of the vehicle is expected to be seated. The vehicle lighting assembly 30 also includes a second lighting assembly 30B arranged to illuminate light onto the front passenger seating area. The vehicle light assembly 30 further includes third and fourth lighting assemblies 30C and 30D each configured to illuminate light onto the respective left and right sides of rear passenger seating areas of the vehicle 10. It should be appreciated that the vehicle lighting assembly 30 may include one or more individual lighting assemblies, each having a plurality of light sources, that may generate and direct light onto the window panel 20 for reflection into one or more areas of the vehicle 10 to provide dome and/or reading lights.

Each of the individual lighting assemblies 30A-30D includes a plurality of light sources 32A-32D shown in phantom in FIGS. 1 and 2 arranged in different portions of the edge portion 22 of the headliner 12, according to one embodiment. Each of the lighting assemblies 30A-30D has four light sources 32A-32D, in the form of light-emitting diodes (LEDs) installed in the edge portion 22 of the headliner 12 adjacent and in close proximity to the window panel 20 and oriented to direct light onto a light reflecting medium on the window panel 20 for reflection towards the desired lighting area. Each of the light sources 32A-32D are located within the edge portion 22 of the headliner 12, and thus are in close proximity to the window panel 20. The light output from the light sources 32A-32D may reflect off the light reflecting medium on a portion of the window panel 20, preferably near the edge of the window panel 20, according to one embodiment.

Figure 3:
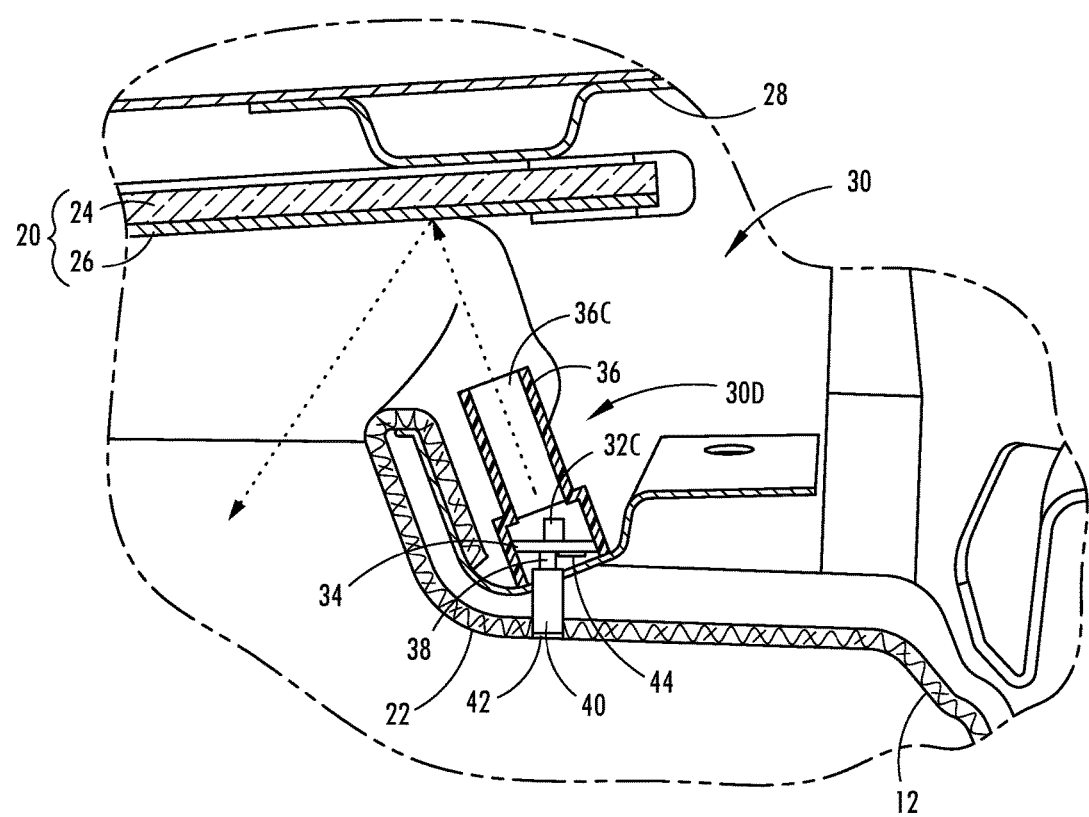
FIG. 3 is a cross-sectional view taken through line of FIG. 2 illustrating one of the lighting assemblies.
Figure 4:
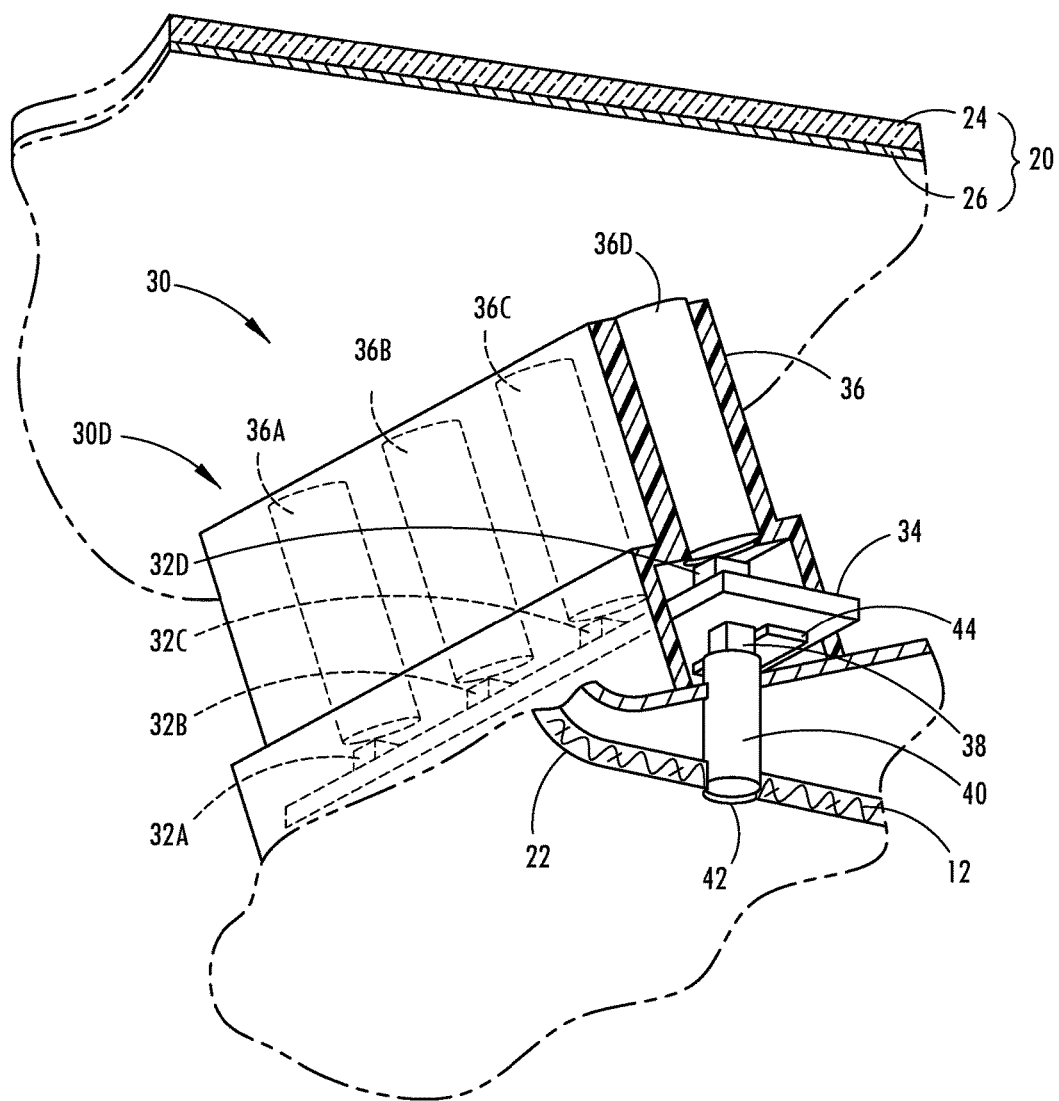
FIG. 4 is an enlarged perspective view of one of the light assemblies relative to the window panel.

Referring to FIGS. 3 and 4, one of the individual lighting assemblies 30D is illustrated having each of the light sources 32A-32D disposed behind an optic element 36, which may include a lens array. The optic element 36 may have four individual optic elements 36A-36D in the form of four lenses that are aligned with each of the light sources 32A-32D, respectively. The optic element 36 may fill a substantial portion of the gap between the edge portion 22 of the headliner 12 and the window panel 20 where the light reflects from, and may form a wiper on the window panel 20. Each of the optic elements 36A-36D focuses light from the respective light sources 32A-32D onto a light reflecting medium 26 provided on a surface of the window panel 24. As such, the window panel 20 includes a substantially transparent window member 24, such as glass, and an underlying light reflecting medium 26, according to the embodiment shown. The light reflecting medium 26 may include a partially light transmissive and partially light reflective medium that allows light to pass through the window panel 20 and reflects light, according to one embodiment. In one specific embodiment, the light reflecting medium 26 may include a Kurz film that may be disposed over a portion of the bottom surface of the window panel 20, such as within a fit region near an edge of the window panel 20. According to another embodiment, the Kurz film may extend across the entire bottom surface of the window panel 20. It should be appreciated that other light reflecting mediums may be employed on the bottom surface or the top surface of the window panel 20 such as a white colored film or silver colored film, according to other embodiments. The light reflecting medium 26 may be in the form of a vacuum metalized film disposed on a surface of the window panel 20 via an adhesive. When the light reflecting medium 26 is substantially reflective and transmits little or no light, then it is preferred that the light reflecting medium 26 cover only a portion of the window panel 20 such as the frit region.

The light sources 32A-32D are shown arranged on a circuit board 34 and positioned to be aligned with respective optic elements 36A-36D. When light is illuminated by each of the light sources 32A-32D, the light is focused by the respective optic elements 36A-36D onto a portion of the light reflecting medium 26 on the surface of the window panel 20 and is redirected via light reflection into a lighting area within the vehicle interior 18. Each of the individual lighting assemblies 30A-30D is positioned and aligned with the window panel 20 so as to direct light into different lighting areas where passengers in the vehicle are intended to be seated. Each of the lighting individual assemblies 30A-30D is individually controlled to illuminate the different lighting areas. By using multiple light sources 32A-32D aligned with multiple optic elements 36A-36D, an increased light output is spread out to provide a lower contrast light beam with less glare. The LEDs forming the light sources 32A-32D may be aligned and connected in series to spread out the light and heat generated therefrom. It should be appreciated that other numbers of one or more light sources may be employed.

Each individual lighting assembly 30A-30D, such as assembly 30D shown in FIGS. 3 and 4, further includes a light input proximity switch in the form of a capacitive switch 44 shown located on the bottom side of the circuit board 34. The capacitive switch 44 generates an activation field that extends through a region of the headliner 12 that provides a touch pad and operates to activate the light sources 32A-32D to turn the corresponding lighting assemblies 30A-30D on and off. In addition, a backlighting light source 38 is located on the bottom side of circuit board 34 and directs light rearward through an opening 40 and passes light through a thin layer of fabric 42 in the headliner 12 so as to illuminate a light switch indicator at or near the touch pad. A surface of the fabric 42 forming the touch pad proximate to opening 40 within the headliner 12 may include pad printing such as a logo or text utilizing a long persistence phosphor that luminescences when a blue LED is used as light source 38 so as to provide for light illumination of the touch pad for the capacitive switch 44. The fabric surface 42 overlaying opening 40 may act as a light diffuser to diffuse the indicator light. A passenger in the vehicle 10 may readily view the light switch input touch pad on fabric surface 42 and may activate the capacitive switch 44 by placing a finger in contact or close proximity to the pad surface and hence the capacitive switch 44 so as to turn on or off the corresponding lighting assembly. It should be appreciated that lighting assemblies 30A-30C may be likewise configured similar to assembly 30D.

Figure 5:
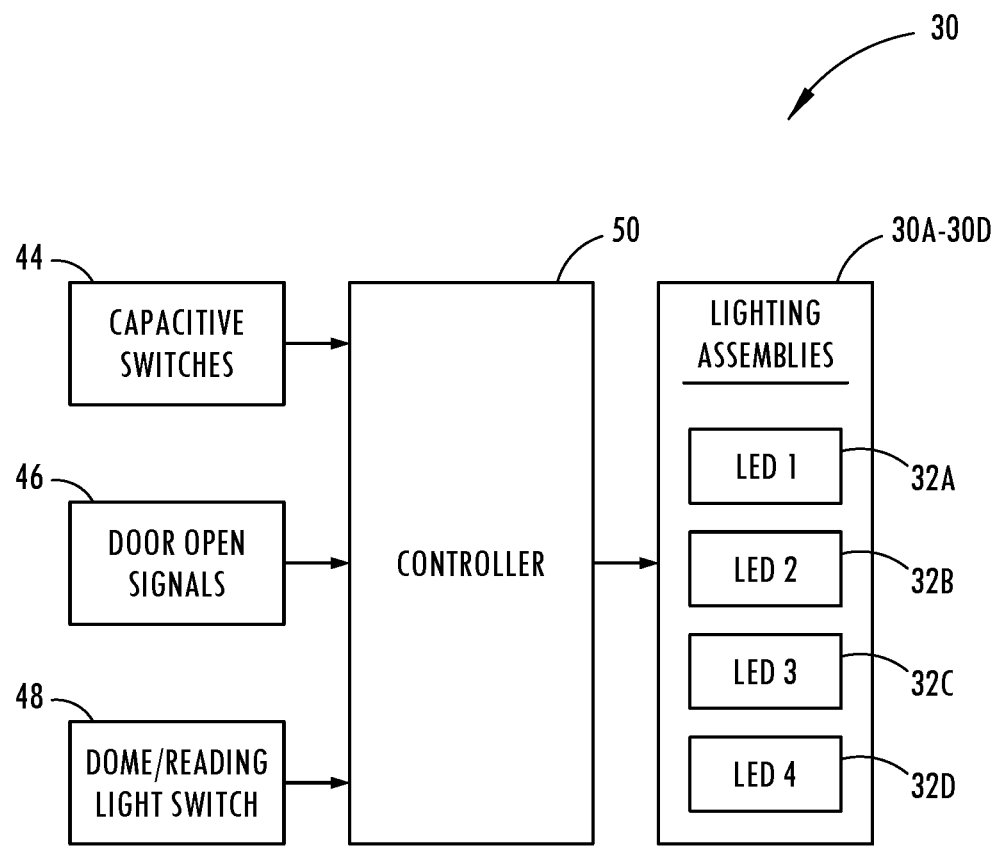
FIG. 5 is a block diagram further illustrating the vehicle lighting assembly and controls therefor.

Referring to FIG. 5, the vehicle lighting assembly 30 is generally shown having control circuitry for controlling the individual lighting assemblies 30A-30D. The vehicle lighting assembly 30 includes a controller 50 which may include a microprocessor or other analog and/or digital control circuitry. The controller 50 may receive signals from each of the capacitive switches 44 which are user inputs to activate or deactivate one or more of the individual lighting assemblies 30A-30D to turn them on or off to generate reading and/or dome lights. In addition, door open signals 46 are input to the controller 50. When a door open is sensed, the controller 50 may activate all of the lighting assemblies 30A-30D at the same time to operate as a dome light. Further, a dome/reading light switch 48 may be installed on the vehicle to allow a user to activate at least one or all of the lighting assemblies 30A-30D. The controller 50 processes each of the inputs and generates outputs to control activation of each of the individual lighting assemblies 30A-30D.

Accordingly, it should be appreciated that the vehicle light assembly 30 may operate as a dome light when a vehicle door is open or a user activates a dome light switch input. Additionally, the individual lighting assemblies 30A-30D may be individually selected to provide a reading light within each of the intended lighting areas. This may include a user activating the capacitive switch corresponding to a desired lighting assembly to turn the lighting assembly on or off to illuminate an area of the vehicle interior. Other lighting assemblies may likewise be turned on and off to illuminate separate lighting areas within the vehicle interior.

It should be appreciated that the vehicle lighting assembly 30 advantageously utilize a window panel, such as a moonroof, with a light reflecting medium 26 to reflect light towards the dedicated lighting area. It should be appreciated that other window panels may be employed, such as a door window and a windshield having a reflective medium in the frit area or elsewhere on the window panel to reflect light towards the dedicated lighting area.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle lighting assembly comprising:
   a panel provided on a roof of a vehicle;
   a headliner provided on the roof;
   a light reflecting medium provided on a surface of the panel; and
   one or more light sources arranged near an edge portion of the headliner and spaced below the panel to direct light upward at an angle directly onto the light reflecting medium for specular reflection downward within an interior of the vehicle.

2. The assembly of claim 1, wherein the panel comprises a substantially transparent window.

3. The assembly of claim 2, wherein the light reflecting medium is provided within a fit area of the window.

4. The assembly of claim 2, wherein the window is located in the roof.

5. The assembly of claim 1, wherein the light reflecting medium comprises a partially reflective and partially transmissive film.

6. The assembly of claim 1, wherein the one or more light sources comprises a first plurality of light sources arranged to direct light off the light reflecting medium into a first area of the vehicle interior and a second plurality of light sources arranged to direct light off the light reflecting medium onto a different second area of the vehicle interior.

7. The assembly of claim 6, wherein the first area is a first seating area and the second area is a second seating area.

8. The assembly of claim 1 further comprising a capacitive switch for activating the plurality of light sources.

9. A vehicle lighting assembly comprising:
   a panel provided on a roof of a vehicle;
   a headliner provided on the roof;
   a light reflecting medium provided on a surface of the panel; and
   a plurality of lighting assemblies arranged near an edge portion of the headliner and spaced below the panel to direct light upward at an angle directly onto the light reflecting medium for specular reflection downward towards first and second areas in an interior of the vehicle.

10. The assembly of claim 9, wherein the panel comprises a substantially transparent window.

11. The assembly of claim 10, wherein the light reflecting medium is provided within a fit area of the window.

12. The assembly of claim 10, wherein the window is located in the roof.

13. The assembly of claim 9, wherein the light reflecting medium comprises a partially reflective and partially transmissive film.

14. The assembly of claim 9, wherein the plurality of lighting assembly comprises a first plurality of light sources arranged to direct light off the light reflecting medium into the first area in the vehicle interior and a second plurality of light sources arranged to direct light off the light reflecting medium onto the second area in the vehicle interior.

15. The assembly of claim 14, wherein the first area is a first seating area and the second area is a second seating area.

16. The assembly of claim 9 further comprising a capacitive switch for activating the plurality of light sources.

17. A vehicle lighting assembly comprising:
a window panel provided on a roof of a vehicle;
a light reflecting medium provided on a surface of the window panel;
a headliner provided on the roof;
a first lighting assembly comprising a first plurality of light sources arranged near an edge portion of the headliner and spaced below the panel to direct light upward at an angle directly onto the light reflecting medium for specular reflection downward towards a first area in an interior of the vehicle; and
a second lighting assembly comprising a second plurality of light sources arranged near an edge portion of the headliner and spaced below the panel to direct light upward at an angle directly onto the light reflecting medium for specular reflection downward towards a second area in the vehicle interior.

18. The assembly of claim 17, wherein the window is located in the roof.

19. The assembly of claim 17, wherein the first area is a first seating area and the second area is a second seating area.

20. The assembly of claim 17 further comprising a capacitive switch for activating the plurality of light sources.

\* \* \* \* \*